United States Patent
Colmone et al.

(10) Patent No.: US 10,576,443 B1
(45) Date of Patent: Mar. 3, 2020

(54) SEALING APPARATUS FOR A CATALYST REGENERATOR

(71) Applicant: UOP LLC, Des Plaines, IL (US)

(72) Inventors: Joseph Colmone, Mount Prospect, IL (US); Michael S. Sandacz, Glen Ellyn, IL (US); Michael A. Stine, Lake Zurich, IL (US); Richard A. Johnson, II, Algonquin, IL (US); Nicholas Madonia, Harwood Heights, IL (US); Minwoo Kim, Wood Dale, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 16/277,103

(22) Filed: Feb. 15, 2019

(51) Int. Cl.
| | | |
|---|---|---|
| *B01J 8/00* | (2006.01) | |
| *B01J 8/18* | (2006.01) | |
| *B01J 8/38* | (2006.01) | |
| *B01J 19/00* | (2006.01) | |
| *B01J 29/40* | (2006.01) | |
| *B01J 29/90* | (2006.01) | |
| *B01J 38/30* | (2006.01) | |

(52) U.S. Cl.
CPC ............ *B01J 8/1872* (2013.01); *B01J 8/388* (2013.01); *B01J 38/30* (2013.01); *B01J 29/40* (2013.01); *B01J 29/90* (2013.01); *B01J 2219/00761* (2013.01); *B01J 2219/185* (2013.01)

(58) Field of Classification Search
CPC ....... B01J 8/00; B01J 8/008; B01J 8/18; B01J 8/1872; B01J 8/24; B01J 8/38; B01J 8/384; B01J 8/388; B01J 19/00; B01J 19/0053; B01J 19/0073; B01J 29/00; B01J 29/04; B01J 29/06; B01J 29/40; B01J 29/90; B01J 38/00; B01J 38/04; B01J 38/12; B01J 38/30; B01J 2208/00796; B01J 2208/00938; B01J 2219/00761; B01J 2219/18; B01J 2219/185; F27D 99/0073; F27D 2009/0081
See application file for complete search history.

(56) References Cited

U.S. PATENT DOCUMENTS

| | | |
|---|---|---|
| 5,063,028 A | 11/1991 | Humble et al. |
| 5,328,667 A | 7/1994 | Johnson |
| 9,233,354 B1 | 1/2016 | Sandacz |

*Primary Examiner* — Natasha E Young
(74) *Attorney, Agent, or Firm* — Paschall & Associates, LLC; James C. Paschall

(57) ABSTRACT

A regenerator for an FCC apparatus. The regenerator includes an internal riser inside of a outer shell. The internal riser includes a cone and a cone skirt. An annulus is formed between the internal riser and the outer shell. A sealing apparatus for keeping catalyst out of a portion of the annulus comprises a first sealing element and a second sealing element disposed above the first sealing element. An annular trough in the annulus below the primary seal is filled with material that has a heat transfer coefficient at least as high as air to allow heat to get to the inner surface of the outer shell.

20 Claims, 2 Drawing Sheets

SEALING APPARATUS FOR A CATALYST REGENERATOR

FIELD

The field relates generally to a catalytic reactor, and more particularly to a sealing apparatus used in a regenerator for a catalytic reactor.

BACKGROUND

Catalytic cracking is accomplished by contacting hydrocarbons in a reaction zone with a catalyst composed of finely divided particulate material. The reaction in catalytic cracking, as opposed to hydrocracking, is carried out in the absence of added hydrogen or the consumption of hydrogen. As the cracking reaction proceeds, substantial amounts of coke are deposited on the catalyst. The catalyst is regenerated at high temperatures by burning coke from the catalyst in a regeneration zone. Coke-containing catalyst, referred to as "spent catalyst", may be continually transported from the reaction zone to the regeneration zone to be regenerated and replaced by essentially coke-free regenerated catalyst from the regeneration zone. Fluidization of the catalyst particles by various gaseous streams facilitates the transport of catalyst between the reaction zone and regeneration zone.

A regeneration zone typically comprises a regenerator vessel that includes an outer shell and an internal riser. The internal riser is typically attached to the outer shell. However, given the extreme high temperatures that occur inside of the regenerator vessel, the riser will expand. Therefore, typically an annulus or void is provided between the outer shell and the internal riser to offer a longer section of internal riser to accommodate the thermal gradient and add more flexibility for thermal stresses. In order to prevent catalyst from filling this annulus, one or more seals are used to keep the annulus relatively free from catalyst.

A primary seal may be disposed between the outer shell and the internal riser comprising a flexible material to allow the shell and the riser to expand at different rates while preventing catalyst from descending below the primary seal. Insulation is installed in the annulus above and below the primary seal to prevent catalyst entry and to mitigate heat transfer to the shell.

Insulation has a low heat transfer coefficient. A heat transfer coefficient characterizes the ability to transfer heat across a medium by conduction, convection and radiation. Insulation typically comprises fibrous material that traps air in interstices between the fibers rendering the air stagnant and insulative against heat transfer. Air is not highly conductive, and it cannot be convective when it is stagnant. Hence, insulation has a low heat transfer coefficient.

There remains a need for an effective and efficient design for sealing an annulus between an internal riser and an outer shell in a catalyst regenerator.

SUMMARY

We have found that an outer shell of a catalyst regenerator can get too cool and allow the condensation of sulfuric acid in an annulus between an internal riser and an outer shell particularly when processing high sulfur feeds. We propose to fill an annular trough below a primary seal in the annulus with material that has at least the heat transfer coefficient of air. The material with a higher heat transfer coefficient will transfer more heat from the hotter riser to the shell to ensure the shell temperature is sufficiently above the sulfuric acid dew point.

Additional objects, embodiments, and details of the invention are set forth in the following detailed description of the invention.

DETAILED DESCRIPTION OF THE DRAWINGS

DETAILED DESCRIPTION

A catalyst regenerator has been developed which facilitates heat transfer across an annulus between an outer surface of a riser and an inner surface of a shell. We have found that insufficient heat transfer across the annulus can allow regions near the inner surface of the shell to become too cool. For example, when processing high sulfur FCC feeds, sulfuric acid can condense in or near the annulus near an inner surface of the outer shell. The acid can permeate the lining of the shell and corrode the carbon steel wall of the shell. We have filled an annular trough in the annulus below the primary seal with a fill material that has at least the heat transfer coefficient of air. The fill material allows heat to transfer from the riser to the inner surface of the wall of the shell to ensure the wall has a high enough temperature to prevent the condensation of sulfuric acid and that the shell wall does not exceed the design temperature.

Figure 1:
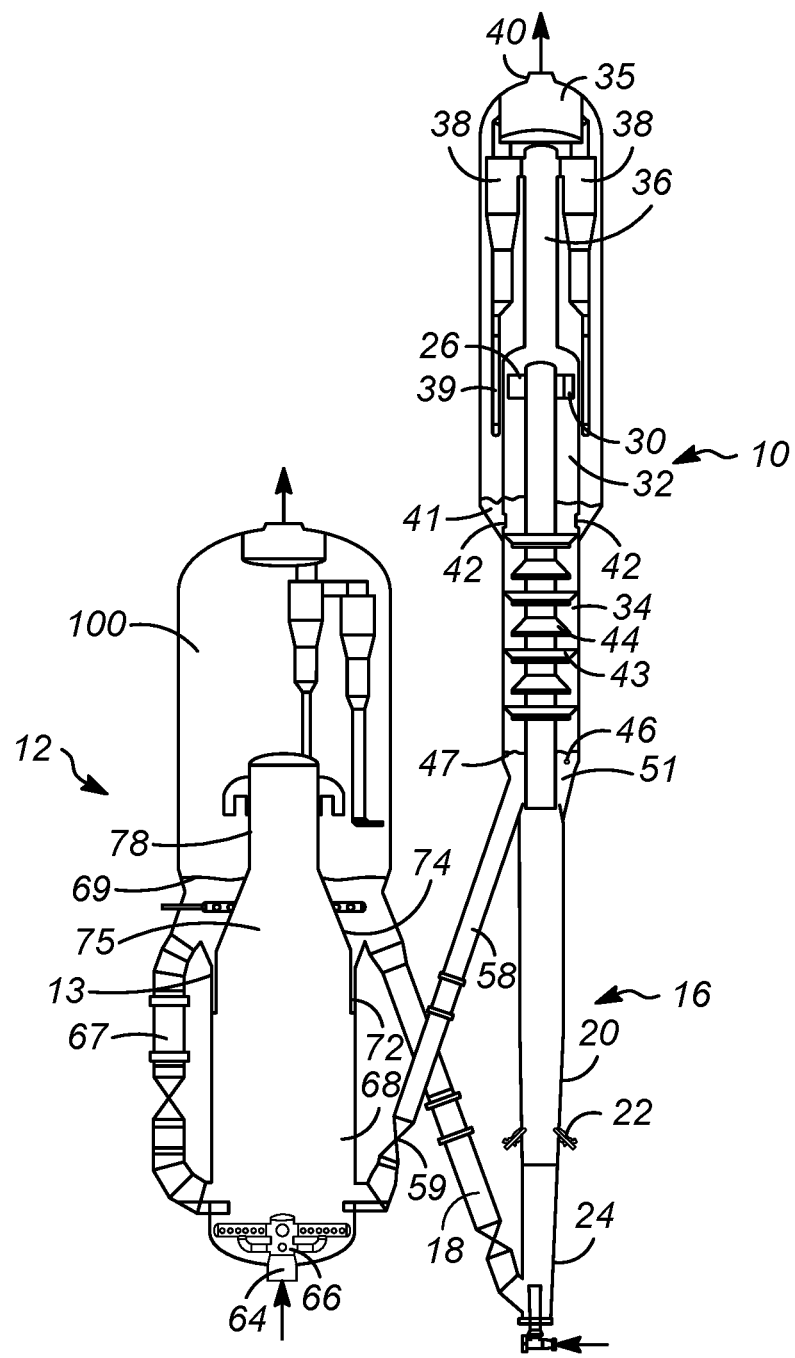
FIG. 1 is a schematic arrangement of a catalytic reactor.

These and other benefits will be appreciated and understood more fully in the context of a catalytic reactor apparatus. The catalytic reactor may comprise an FCC apparatus such as shown in FIG. 1. The catalytic reactor may comprise a reactor vessel 10, a regenerator vessel 12 with an outer shell 13, and a reactor riser 16 that provides a pneumatic conveyance zone in which conversion takes place. The apparatus circulates catalyst to contact feed in the manner hereinafter described.

The catalyst comprises any of the well-known catalysts that are used in the art of fluidized catalytic cracking, such as an active amorphous clay-type catalyst and/or a high activity, crystalline molecular sieve. Molecular sieve catalysts are preferred over amorphous catalysts because of their much-improved selectivity to desired products. Zeolites are the most commonly used molecular sieves in FCC processes. Preferably, the first catalyst comprises a large pore zeolite, such as a Y-type zeolite, an active alumina material, a binder material, comprising either silica or alumina and an inert filler such as kaolin. A catalyst additive may comprise a medium or smaller pore zeolite catalyst exemplified by ZSM-5, ZSM-11, ZSM-12, ZSM-23, ZSM-35, ZSM-38, ZSM-48, and other similar materials. U.S. Pat. No. 3,702,886 describes ZSM-5.

FCC feedstocks, suitable for processing by this invention, include conventional FCC feeds and higher boiling or residual feeds. The most common of the conventional feeds is a vacuum gas oil which is typically a hydrocarbon material having an IBP of at least about 232° C. (450° F.), a T5 of between about 288° C. (550° F.) and about 392° C. (700° F.), typically no more than about 343° C. (650° F.), a T95 between about 510° C. (950° F.) and about 570° C. (1058° F.) and/or an EP of no more than about 626° C. (1158° F.) prepared by vacuum fractionation of atmospheric residue as determined by any standard gas chromatographic simulated distillation method such as ASTM D2887, D6352 or D7169, all of which are used by the petroleum industry. As used herein, the term "T5" or "T95" means the temperature at which 5 mass percent or 95 mass percent, respectively, of the sample boils using the ASTM D-86 or the "True Boiling Point" (TBP) method. As used herein, the term, TBP, means a test method for determining the boiling point of a material which corresponds to ASTM D-2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio. As used herein, the term "initial boiling point" (IBP) means the temperature at which the sample begins to boil using ASTM D-7169, ASTM D-86 or TBP, as the case may be. As used herein, the term "end point" (EP) means the temperature at which the sample has all boiled off using ASTM D-7169, ASTM D-86 or TBP, as the case may be. The FCC process is suited best for feed stocks that are heavier than naphtha range hydrocarbons boiling above about 177° C. (350° F.).

Returning to FIG. 1, the reactor riser 16 provides a conversion zone for cracking of the feed hydrocarbons. The reactor riser 16 may have an outer shell 20 or wall. The reactor riser 16 typically operates with dilute phase conditions above the point of feed injection wherein the density is usually less than 320 kg/m$^3$ (20 lb/ft$^3$) and, more typically, less than 160 kg/m$^3$ (10 lb/ft$^3$). Feed is introduced into the reactor riser 16 by one or more nozzles or distributors 22 between an entrance 24 to the reactor riser 16 and substantially upstream from an outlet 30. Volumetric expansion resulting from the rapid vaporization of the feed as it enters the reactor riser 16 further decreases the density of the catalyst within the reactor riser 16 to typically less than 160 kg/m$^3$ (10 lb/ft$^3$). Before contacting the catalyst, the feed will ordinarily have a temperature in a range of from 149° C. (300° F.) to 316° C. (600° F.). Additional amounts of feed may be added downstream of the initial feed point.

The catalyst and reacted feed vapors are then discharged from the top of the reactor riser 16 through the outlet 30 and separated into a cracked product vapor stream including cracked products and a collection of catalyst particles covered with substantial quantities of coke and generally referred to as "spent catalyst." In an effort to minimize the contact time of the products with the catalyst which may promote further conversion of desired products to undesirable other products, any arrangement of separators may be used to remove spent catalyst from the product stream quickly.

For example, a swirl arm arrangement 26 may be provided at the end of the reactor riser 16 which can further enhance initial separation of catalyst from cracked product vapors by imparting a tangential velocity to the exiting mixture of catalyst and cracked product vapor. The swirl arm arrangement 26 may be located in an upper portion of a disengaging chamber 32. The disengaging chamber 32 is in downstream communication with the outlet 30. The term "downstream communication" means that at least a portion of fluid flowing to the subject in downstream communication may operatively flow from the object with which it fluidly communicates. A stripping zone 34 may be situated in the lower portion of the disengaging chamber 32. Catalyst separated by the swirl arm arrangement 26 drops down into the stripping zone 34. The cracked product vapor stream, comprising cracked hydrocarbons and some spent catalyst, exits the disengaging chamber 32 via a conduit 36 which is in upstream communication with one or more cyclones 38. The cyclones 38, in downstream communication with the outlet 30 via the conduit 36, remove remaining catalyst particles from the product vapor stream to reduce particle concentrations to very low levels. The product vapor stream may then exit the top of the reactor vessel 10 through an outlet 40 via a plenum chamber 35. Any catalyst separated by the cyclones 38 may return to the reactor vessel 10 through one or more dip leg conduits 39 into a dense bed 41 where the spent catalyst will enter the stripping zone 34 in the disengaging chamber 32 through openings 42.

The stripping zone 34 removes hydrocarbons entrained with the spent catalyst and hydrocarbons adsorbed on the surface of the catalyst by counter-current contact with an inert gas such as steam. Various baffles 43, 44 may facilitate contact of the steam with the spent catalyst. Other stripping internals may be suitable. Inert gas enters the stripping zone 34 through a nozzle 46. A bed 47 of stripped catalyst may accumulate at the base of the stripping zone 34 which can be designated a distribution zone 51 in the disengaging chamber 32.

Spent, stripped catalyst is transported to the regenerator vessel 12 of the regeneration zone, for example, through a spent catalyst conduit 58 in downstream communication with the distribution zone 51. The rate of transportation of catalyst may be regulated by a control valve 59. The control valve 59 may also be used to control the depth of the catalyst bed 47 in the stripping zone 34.

On the regeneration side of the process, the spent catalyst which is transferred to the regenerator vessel 12, via the conduit 58, undergoes a typical combustion of coke from the surface of the catalyst particles by contact with an oxygen-containing gas. The regenerator vessel 12 may be a combustor-type of regenerator, which may use hybrid turbulent bed-fast fluidized conditions in a high-efficiency regenerator vessel 12 for completely regenerating spent catalyst. However, other regenerator vessels and other flow conditions may be suitable.

The reactor conduit 58 feeds spent catalyst to a first or lower chamber 68. The spent catalyst from the reactor vessel 10 usually contains carbon in an amount of from 0.2 to 2 wt-%, which is present in the form of coke. An oxygen-containing combustion gas, typically air, enters the first chamber 68 of the regenerator 12 through a conduit 64 and is distributed by a distributor 66. Openings in the distributor 66 emit combustion gas. As the combustion gas contacts spent catalyst, it typically lifts the catalyst under fast fluidized flow conditions. The lifted catalyst may have a catalyst density of from 48 to 320 kg/m$^3$ (3 to 20 lb/ft$^3$) and the combustion gas may have a superficial gas velocity of 1.1 m/s (3.5 ft/s) to 2.2 m/s (7 ft/s) in the first chamber 68. The oxygen in the combustion gas contacts the spent catalyst and combusts carbonaceous deposits from the catalyst to at least partially regenerate the catalyst and generate flue gas.

The mixture of catalyst and flue gas in the first chamber 68 ascend from a cone skirt 72 through a cone 74 to a cylinder 78 which together provide an internal riser 75 of the regenerator vessel 12. The cone 74 gradually constricts the mixture of catalyst and flue gas along its height to increase its velocity and density preparing it for accelerated travel through a cylinder 78 of the internal riser 75. As, the mixture of catalyst passes into the cone 74 of the internal riser 75, the gas accelerates because of the gradually reducing cross-sectional area of the cone 74. The superficial gas velocity will usually exceed about 2.2 m/s (7 ft/s). The density of the catalyst in the riser 75 is typically less than about 80 kg/m³ (5 lb/ft³). Due to the combustion of the coke occurring within the first chamber 68, the riser 75 typically has a temperature (during normal operation mode) of about 732° C. (1350° F.) to 760° C. (1400° F.). On the other hand, the outer shell 13 typically has a temperature between approximately 93° C.). (200° to about 200° C. (400° F.).

Hot regenerated catalyst from a dense catalyst bed 69 in an upper or second chamber 100 may be recirculated into the first chamber 68, for example, via an external recycle standpipe 67 regulated by a control valve to raise the overall temperature of the catalyst and gas mixture in the first chamber 68. Additionally, regenerated catalyst which has passed from the internal riser 75 to the upper chamber 100 may be transported back to the reactor vessel 10 through a regenerated standpipe 18.

Figure 2:
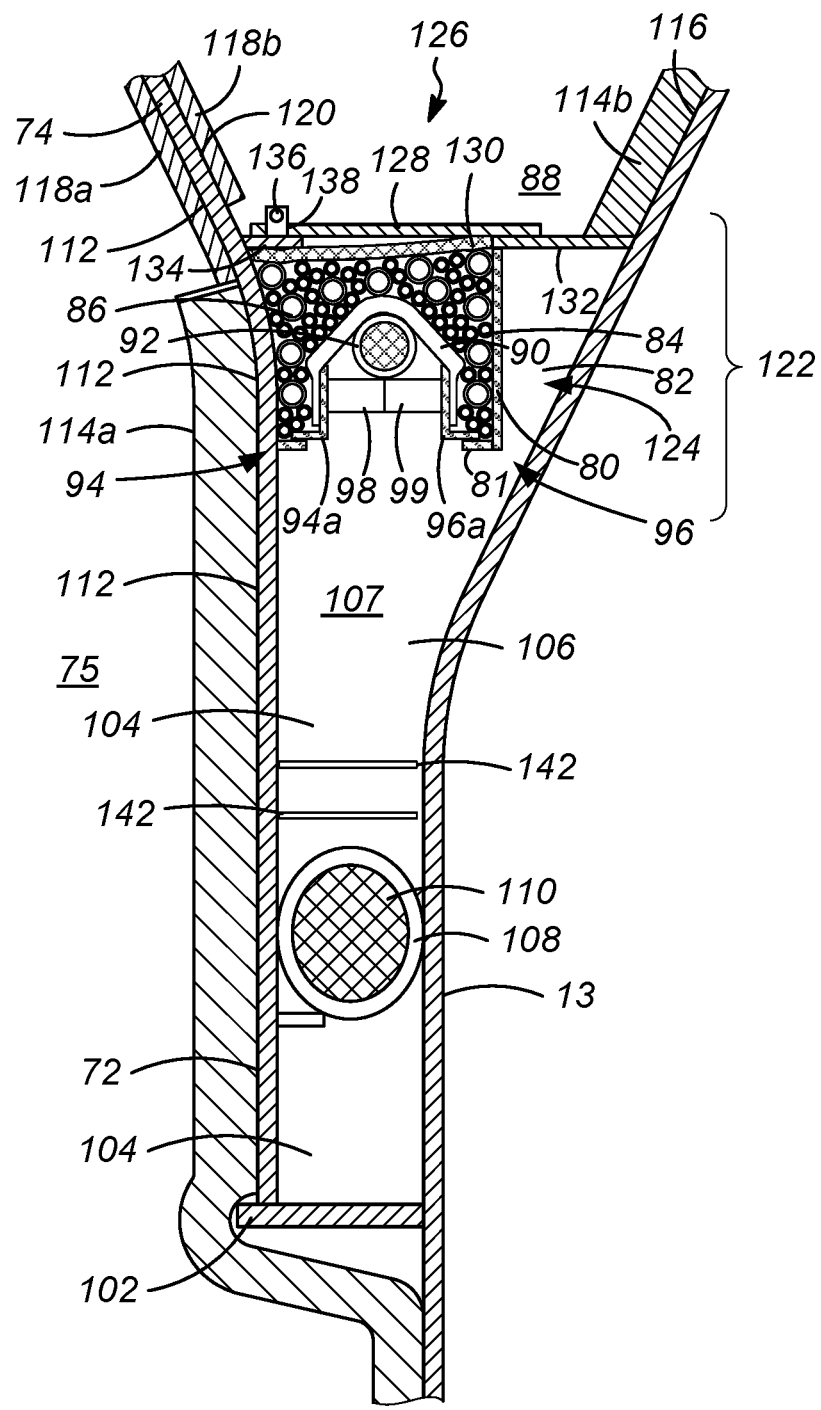
FIG. 2 is a side cutaway view of an annulus of a catalyst regenerator.

As can be seen in FIG. 2, the cone skirt 72 of the internal riser 75 may be supported by a support ring 102 secured to the outer shell 13 of the regenerator vessel 12. Other attachment configurations are contemplated. The cone skirt 72 is typically sized with a smaller diameter than the outer shell 13 such that an annulus 104 is defined between the cone skirt 72 and the outer shell 13. A retaining element 108, such as a braided stainless steel hose 110, may be secured to the cone skirt 72, the outer shell 13, or both to prevent any material or catalyst from descending past the retaining element 108 in the annulus 104.

In order to create a gradual temperature gradient along the length of the internal riser 75, an inner surface 112 of the internal riser 75 at the cone skirt 72 may include a refractory lining 114a. Additionally, a portion of an inner surface 116 of the outer shell 13 above an outer support ring 132 may also include a refractory lining 114b. Furthermore, the inner surface 112 of the internal riser 75 at the cone 74 above the cone skirt 72 may also include an abrasion resistant lining 118a. An outer surface 120 of the internal riser 75 at the cone 74 above the cone skirt 72 may also include an abrasion resistant lining 118b. The abrasion resistant lining 118a, 118b protects the internal riser 75 from erosion.

In order to minimize the amount of catalyst that flows into the annulus 104, a sealing apparatus 122 is utilized between the outer shell 13 and the internal riser 75. Typically, the sealing apparatus 122 includes a primary seal 124 and a secondary seal 126. The secondary seal 126 is disposed above (i.e., at a higher elevation) than the primary seal 124.

The primary seal 124 may be located in the annulus between the internal riser 75 and the outer shell 13. The primary seal 124 may comprise, for example, an expansion element, preferably an omega seal. The primary seal 124 comprises a flexible particle barrier 90 located between the internal riser 75 and the outer shell 13. The flexible particle barrier 90 may be gas permeable. The flexible particle barrier 90 may comprise in an embodiment two layers of knitted wire mesh on the outside of layers of silica fabric cloth which in turn surround two layers of ceramic fiber blanket insulation separated by another layer of silica fabric cloth. In one embodiment of the flexible particle barrier 90, the two layers of wire mesh may be made from about 0.03 mm (0.012 inch) thick type 309 stainless steel, and the layers of ceramic fiber blanket insulation are each about 13 mm (0.5 inch) thick with a density of about 128 kg/m³ (8 lb/ft³). Where the operating temperatures inside the internal riser 75 are in excess of 538° C. (1000° F.), all metallic internals will typically comprise stainless steel and more particularly type 309 or 304 stainless steel.

A bolt and a backing bar or other fastener may secure a first side 94 of the flexible element 90 to a first bracket 94a.

Similarly, a separate bolt and a backing bar or other fastener may secure the opposite, second side 96 of the flexible element 90 to a second bracket 96a. A series of spaced apart first lugs 98 extend from first bracket 94 towards the second bracket 96 and another series of second lugs 99 offset from the first lugs 98 extend towards the first bracket 94 from the second bracket 96. The first lugs 98 and the second lugs 99 carry a support member 92. The support member 92 is ordinarily a ring of hollow tubing that sustains the flexible element 90 under the load of any particulate or other material that deposits on top of the primary seal 124. The first bracket 94a and the second bracket 96a may take the form of L-brackets.

The first side of the primary seal 124 may be supported by the internal riser 75. As such, a lower end of the first bracket 94a may be supported by the internal riser 75. For example, the lower end of the first bracket 94a may be attached to a ring secured to an outer surface 120 of the internal riser 75 such as at the cone skirt 72 or the lower end of the first bracket 94a may be secured directly to the internal riser. The first side 94 of the primary seal is supported laterally by the internal riser 75 at a location lateral to a lower end of the first side.

The second side 96 of the primary seal 124 may be supported above the primary seal. The second side 96 may flex slightly with respect to the outer shell 13. An intermediate wall 80 is disposed between the second side 96 and the outer shell 13. The intermediate wall 80 may depend from an outer support ring 132, as will be explained. A bottom end of the intermediate wall 80 may be attached to the second side 96 of the primary seal 124. The second bracket 96a may be attached to the bottom end of the intermediate wall 80 to support the second side 96 of the primary seal. Specifically, the second bracket 96a may be attached to a ring 81 that is secured to or unitary with the bottom end of the intermediate wall 80.

The catalyst seal section extends circumferentially around the entire periphery of the internal riser 75 to provide a complete seal for the annulus 104. In most arrangements, the primary seal 124 will have a ring shape. The configuration of the primary seal 124 may be altered as necessary to suit the geometry of the internal riser 75 provided the seal has an arrangement that blocks the migration of particulate material into the annulus 104.

In an embodiment, the secondary seal 126 includes a sealing ring 128 which may comprise at least one plate, or a plurality of plates. The sealing ring 128 is preferably pivotable and can be angled or horizonal with respect to vertical. In various embodiments, the sealing ring 128 can form a lap joint (i.e., overlap) with an outer support ring 132, which is secured to the inner surface 116 of the outer shell 13. The outer support ring 132 provides the support to the secondary seal 126 from the outer shell 13. The secondary seal 126 may also include an inner seal support ring 134 secured to the outer surface 120 of the internal riser 75. The inner seal support ring 134 may include one or more posts 136 that may protrude through an aperture 138 in the sealing ring 128 to allow the sealing ring to pivot. When the temperature of the internal riser 75 begins to increase due to the temperature of the combustion occurring in chamber 68, the cone 74 of the internal riser 75 will expand upward and outward relative to the outer shell 13. An inner circumference of the sealing ring 128 will pivot upwardly allowing an outer circumference of the sealing ring 128 to maintain the lap joint with the outer support ring 132. This movement will allow the secondary seal 128 to inhibit the flow of catalyst into the annulus 104 and on to the primary seal 126. The post 136 may include a retaining bolt to ensure the sealing ring does not disengage from the post.

The outer support ring 132 may be secured to the inner surface 116 of the outer shell 13. The intermediate wall 80 may be supported at a top end by the support ring 132 at a securement location spaced from the outer shell 13. A top end of the intermediate wall 80 may be attached to the support ring 132, so the ultimate support of the second side 96 of the primary seal 124 is above the primary seal by attachment to the outer support ring 132.

An annular hopper 88 is provided above the sealing apparatus 122 so to distribute regenerated catalyst into the regenerated standpipe 18. Catalyst will accumulate and can stagnate on top of the outer support ring 132 and act as an insulator. Insulation can inhibit heat from the internal riser 75 from transmitting to the outer shell 13 which can result in cooling and perhaps condensing of sulfuric acid present in combustion gases.

An annular trough 106 may be located in the annulus 104 below the primary seal 124 between the internal riser 75 and the outer shell 13. The annular trough 106 should be filled with a fill material 107 to balance heat transfer to the shell. The fill material 107 should have a heat transfer coefficient of at least 0.45 W/m²° C. (0.083 BTU/hr·ft²° F.). Preferably, the fill material 107 has a heat transfer coefficient at least as high as air. For example, at 250° C. (482° F.) and atmospheric pressure, which may be typical in the annular trough 106, air has a heat transfer coefficient of about 17 W/m²° C. (3 BTU/hr·ft²° F.). Movable air has a greater heat transfer coefficient than insulative materials which are conventionally installed in the annular trough 106. Insulative materials are designed to keep air in interstitial pockets between fibers stagnant and less conductive of heat. Air that is free to move is able to conduct heat to a limited extent but also transfer heat by convective air currents. In an aspect, the annular trough 106 need not be packed with insulation. In an embodiment, some of the outer surface 120 of the internal riser 75 in the annular trough 106 may be covered with a layer of insulation. However, in such embodiment, the rest of the annular trough 106 may be filled with the fill material 107. Air may be the preferred fill material 107. The primary seal 124 and the intermediate wall 80 prevent catalyst from entering the annular trough 106 and accumulating to act as an insulator. Air in the trough 106 or another selected fill material 107 serves to conduct and/or convect heat from the internal riser 75 to the outer shell 13 to ensure the outer shell 13 has a temperature sufficiently above the sulfuric acid dew point to avoid condensation of sulfuric acid and corrosion of the outer shell 13 or other internals. The temperature of inner surface 116 of the outer shell 13 should be kept above about 177° C. (350° F.) to avoid condensation of sulfuric acid.

The intermediate wall 80 defines a recess 82 between the intermediate wall and the inner surface 116 of the outer shell 13. A passageway 83 allows the annular trough 106 to communicate with the recess 82. The recess 82 may be filled with fill material 107 such as air or another material having a heat transfer coefficient at least as high as air to ensure that the outer shell 13, particularly below the outer support ring 132, is sufficiently heated. Hence, allowing heat to conduct or convect through the passageway 83 into the recess 82 below the outer support ring 132 will ensure the outer shell 13 above the outer support ring 132, particularly at the inner surface 116 of the outer shell 13, will not get too cool even if insulated by stagnant catalyst. If air is in the annular trough 106, air moving through the passageway 83 into the recess 82 will enable heat convection into the recess below the outer support ring 132.

The intermediate wall 80 and an outer surface 120 of the internal riser 75 may define a primary seal cavity 84 which may be located below the secondary seal 126 and above the primary seal 124. A conductive material 86 may fill the primary seal cavity 84 to conduct heat from the internal riser 75 to the outer shell 13, particularly to the recess 82 below the secondary seal 126 at the shell. The conductive material 86 should be more thermoconductive than air, fill the primary seal cavity 84 and be flexible to accommodate differential thermal movement. The conductive material 86 may comprise metallic hose braid seals. Metallic hose braid seals are conductive and may also fill the primary seal cavity 84 to obstruct entry of catalyst leaking past the secondary seal 126. Other compressible/elastic materials that are infused with metallic fibers or conductive material may also be adequate conductive material 86. The conductive material 86 in the primary seal cavity 84 serves to balance and regulate heat transfer from the internal riser 75 to the outer shell 13 through the recess 82 to ensure the outer shell 13 has a temperature sufficiently above the sulfuric acid dew point to avoid condensation of sulfuric acid and corrosion of the outer shell 13 or other internals. It is also contemplated that the primary seal cavity 84 be filled with a fill material that has a heat transfer coefficient at least as high as air or be filled with an insulative material which has a heat transfer coefficient less than that of air.

The secondary seal 126 may include a flexible cover 130 between the internal riser 75 and the outer shell 13. The cover 130 may comprise a flexible mesh, a woven mesh seal, filters, or a metallic screen to help prevent or mitigate catalyst ingress below the removable sealing ring 128 or even in the place of the sealing ring 128 if the flexible cover 130 were extended from the outer surface 120 of the internal riser 75 to the inner surface 116 of the outer shell 13. The cover 130 may be a fiber blanket shrouded in a flexible mesh.

Catalyst in the annular hopper 88 will bear a weight load on the secondary seal 126. The sealing ring 128 is an imperfect seal and the first line of defense against catalyst ingress into the annulus 104 below the primary seal 124. Catalyst in the primary seal cavity 84 will bear a weight load on the primary seal 124. The flexible cover 130 can be fixed at one end to the support ring 132 or to the inner surface 116 of the outer shell 13 and at the other end to the outer surface 120 of the internal riser 75 and flex during operation. Alternatively, the flexible cover 130 can be configured to slide at one end on the support ring 132 or the inner surface 116 of the outer shell 13 and/or at the other end on the outer surface 120 of the internal riser 75. The flexible cover 130 may be used with or without the conductive material 86 filling the primary seal cavity 84 to mitigate catalyst entry into the primary seal cavity or keep the primary seal cavity 84 substantially free of catalyst to conduct more heat to the outer shell 13.

Specific Embodiments

One or more conductive fins 142 secured to and extending from the outer surface 120 of the internal riser 75 toward but not all the way to the outer shell 13 may also conduct heat from the riser to the shell. A gap defined between the edge of the fins 142 and the inner surface 116 of the outer shell 13 may also allow convective heat transfer in the annular trough 106 and thermal expansion of the fins 142.

It should be appreciated by those of ordinary skill in the art that the above described embodiments or portions thereof may be combined in any manner.

While the following is described in conjunction with specific embodiments, it will be understood that this description is intended to illustrate and not limit the scope of the preceding description and the appended claims.

A first embodiment of the invention is a regenerator for regenerating catalyst from a reactor, the regenerator comprising an internal riser comprising a cone and a cone skirt, an outer shell surrounding the internal riser and forming an annulus between the internal riser and the outer shell, a bottom of the cone skirt being secured to the outer shell; a primary seal located in the annulus between the internal riser and the outer shell; and an annular trough in the annulus below the primary seal, the annular trough filled with fill material that has a heat transfer coefficient at least as high as air. An embodiment of the invention is one, any or all of prior embodiments in this paragraph up through the first embodiment in this paragraph further including a secondary seal disposed above the primary seal. An embodiment of the invention is one, any or all of prior embodiments in this paragraph up through the first embodiment in this paragraph wherein the primary seal comprises a flexible particle barrier with a first side supported by the internal riser and a second side supported above the primary seal. An embodiment of the invention is one, any or all of prior embodiments in this paragraph up through the first embodiment in this paragraph further including an intermediate wall disposed between the second side and the outer shell and the second side is attached to the intermediate wall. An embodiment of the invention is one, any or all of prior embodiments in this paragraph up through the first embodiment in this paragraph wherein the intermediate wall is attached to the secondary seal. An embodiment of the invention is one, any or all of prior embodiments in this paragraph up through the first embodiment in this paragraph further comprising a recess defined between the intermediate wall and the outer shell. An embodiment of the invention is one, any or all of prior embodiments in this paragraph up through the first embodiment in this paragraph further comprising a passageway between the annular trough and the recess. An embodiment of the invention is one, any or all of prior embodiments in this paragraph up through the first embodiment in this paragraph further comprising a primary seal cavity between the intermediate wall and the internal riser. An embodiment of the invention is one, any or all of prior embodiments in this paragraph up through the first embodiment in this paragraph further comprising a conductive material filling the primary seal cavity, the conductive material being more thermoconductive than air. An embodiment of the invention is one, any or all of prior embodiments in this paragraph up through the first embodiment in this paragraph further including a flexible cover between the internal riser and the outer shell in the secondary seal. An embodiment of the invention is one, any or all of prior embodiments in this paragraph up through the first embodiment in this paragraph further comprising a flexible barrier between the riser and the outer shell in the annular trough. An embodiment of the invention is one, any or all of prior embodiments in this paragraph up through the first embodiment in this paragraph further comprising conductive fins in the annular trough.

A second embodiment of the invention is a regenerator for regenerating catalyst from an FCC reactor, the regenerator comprising an internal riser comprising a cone and a cone skirt, an outer shell surrounding the internal riser and forming an annulus between the internal riser and the outer shell, a bottom of the cone skirt being secured to the outer shell; a primary seal disposed in the annulus between the internal riser and the outer shell, the primary seal comprising a flexible particulate barrier with a first side attached to a wall of the internal riser and a second side that is supported above the primary seal; and an annular trough in the annulus below the primary seal, the annular trough filled with material that has a heat transfer coefficient at least as high as air. An embodiment of the invention is one, any or all of prior embodiments in this paragraph up through the second embodiment in this paragraph further including an intermediate wall disposed between the second side and the outer shell and the second side is attached to the intermediate wall. An embodiment of the invention is one, any or all of prior embodiments in this paragraph up through the second embodiment in this paragraph further including a secondary seal disposed above the primary seal and the intermediate wall is attached to the secondary seal.

A third embodiment of the invention is a regenerator for regenerating catalyst from a reactor, the regenerator comprising an internal riser comprising a cone and a cone skirt, an outer shell surrounding the internal riser and forming an annulus between the internal riser and the outer shell, a bottom of the cone skirt being secured to the outer shell; a primary seal disposed in the annulus between the internal riser and the outer shell; an intermediate wall disposed between the primary seal and the outer shell; and an annular trough in the annulus below the primary seal, the annular trough being filled with a fill material that has a heat transfer coefficient that is at least as high as air. An embodiment of the invention is one, any or all of prior embodiments in this paragraph up through the third embodiment in this paragraph wherein the primary seal comprises a flexible particulate barrier with a first side attached to a wall of the internal riser and a second side attached to the intermediate wall that is supported above the primary seal. An embodiment of the invention is one, any or all of prior embodiments in this paragraph up through the third embodiment in this paragraph further comprising a recess defined between the intermediate wall and the outer shell. An embodiment of the invention is one, any or all of prior embodiments in this paragraph up through the third embodiment in this paragraph further comprising a passageway between the annular trough and the recess. An embodiment of the invention is one, any or all of prior embodiments in this paragraph up through the third embodiment in this paragraph further including a secondary seal disposed above the primary seal and the intermediate wall is attached to the secondary seal.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. A regenerator for regenerating catalyst from a reactor, the regenerator comprising:
   an internal riser comprising a cone and a cone skirt, an outer shell surrounding the internal riser and forming an annulus between the internal riser and the outer shell, a bottom of the cone skirt being secured to the outer shell;

a primary seal located in the annulus between the internal riser and the outer shell; and an annular trough in the annulus below the primary seal, said annular trough filled with fill material that has a heat transfer coefficient at least as high as air.

2. The regenerator of claim 1 further including a secondary seal disposed above the primary seal.

3. The regenerator of claim 2 further including a flexible cover between the internal riser and the outer shell in the secondary seal.

4. The regenerator of claim 1 wherein the primary seal comprises a flexible particle barrier with a first side supported by said internal riser and a second side supported above said primary seal.

5. The regenerator of claim 4 further including an intermediate wall disposed between said second side and said outer shell and said second side is attached to said intermediate wall.

6. The regenerator of claim 5 wherein said intermediate wall is attached to a secondary seal.

7. The regenerator of claim 5 further comprising a recess defined between said intermediate wall and said outer shell.

8. The regenerator of claim 7 further comprising a passageway between said annular trough and said recess.

9. The regenerator of claim 5 further comprising a primary seal cavity between said intermediate wall and said internal riser.

10. The regenerator of claim 9 further comprising a conductive material filling said primary seal cavity, said conductive material being more thermoconductive than air.

11. The regenerator of claim 1 further comprising a flexible barrier between said riser and said outer shell in said annular trough.

12. The regenerator of claim 1 further comprising conductive fins in said annular trough.

13. A regenerator for regenerating catalyst from an FCC reactor, the regenerator comprising:

an internal riser comprising a cone and a cone skirt, an outer shell surrounding the internal riser and forming an annulus between the internal riser and the outer shell, a bottom of the cone skirt being secured to the outer shell;

a primary seal disposed in the annulus between the internal riser and the outer shell, said primary seal comprising a flexible particulate barrier with a first side attached to a wall of said internal riser and a second side that is supported above said primary seal; and an annular trough in the annulus below the primary seal, said annular trough filled with material that has a heat transfer coefficient at least as high as air.

14. The regenerator of claim 13 further including an intermediate wall disposed between said second side and said outer shell and said second side is attached to said intermediate wall.

15. The regenerator of claim 14 further including a secondary seal disposed above the primary seal and said intermediate wall is attached to said secondary seal.

16. A regenerator for regenerating catalyst from a reactor, the regenerator comprising:

an internal riser comprising a cone and a cone skirt, an outer shell surrounding the internal riser and forming an annulus between the internal riser and the outer shell, a bottom of the cone skirt being secured to the outer shell;

a primary seal disposed in the annulus between the internal riser and the outer shell;

an intermediate wall disposed between said primary seal and said outer shell; and an annular trough in the annulus below the primary seal, said annular trough being filled with a fill material that has a heat transfer coefficient that is at least as high as air.

17. The regenerator of claim 16 wherein the primary seal comprises a flexible particulate barrier with a first side attached to a wall of said internal riser and a second side attached to said intermediate wall that is supported above said primary seal.

18. The regenerator of claim 17 further comprising a recess defined between said intermediate wall and said outer shell.

19. The regenerator of claim 18 further comprising a passageway between said annular trough and said recess.

20. The regenerator of claim 16 further including a secondary seal disposed above the primary seal and said intermediate wall is attached to said secondary seal.

* * * * *